May 31, 1932. R. W. PITTMAN 1,860,949
MOTION PICTURE APPARATUS
Filed Feb. 4, 1928 2 Sheets-Sheet 1
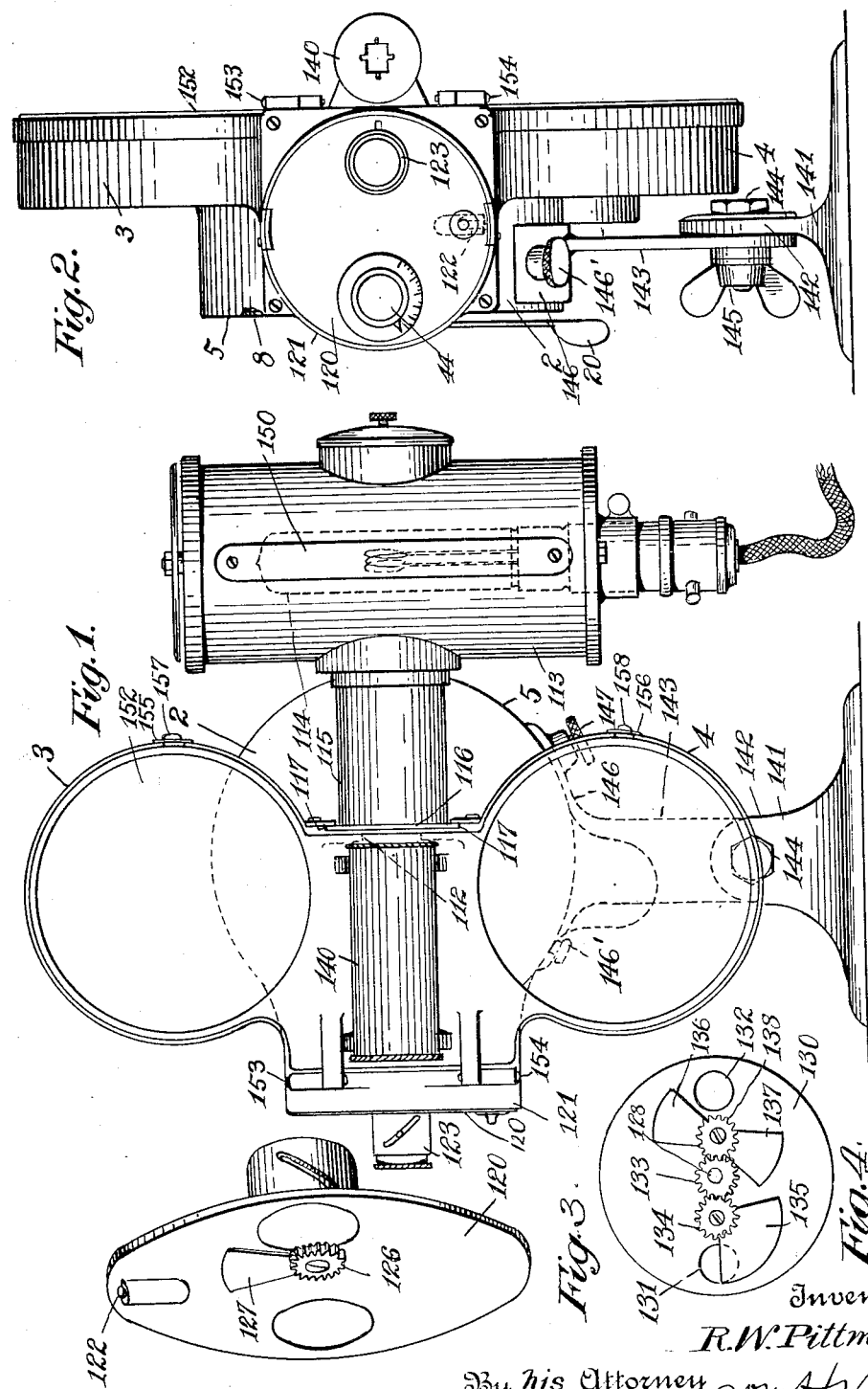
Inventor
R. W. Pittman
By his Attorney Wm. H. Reid.

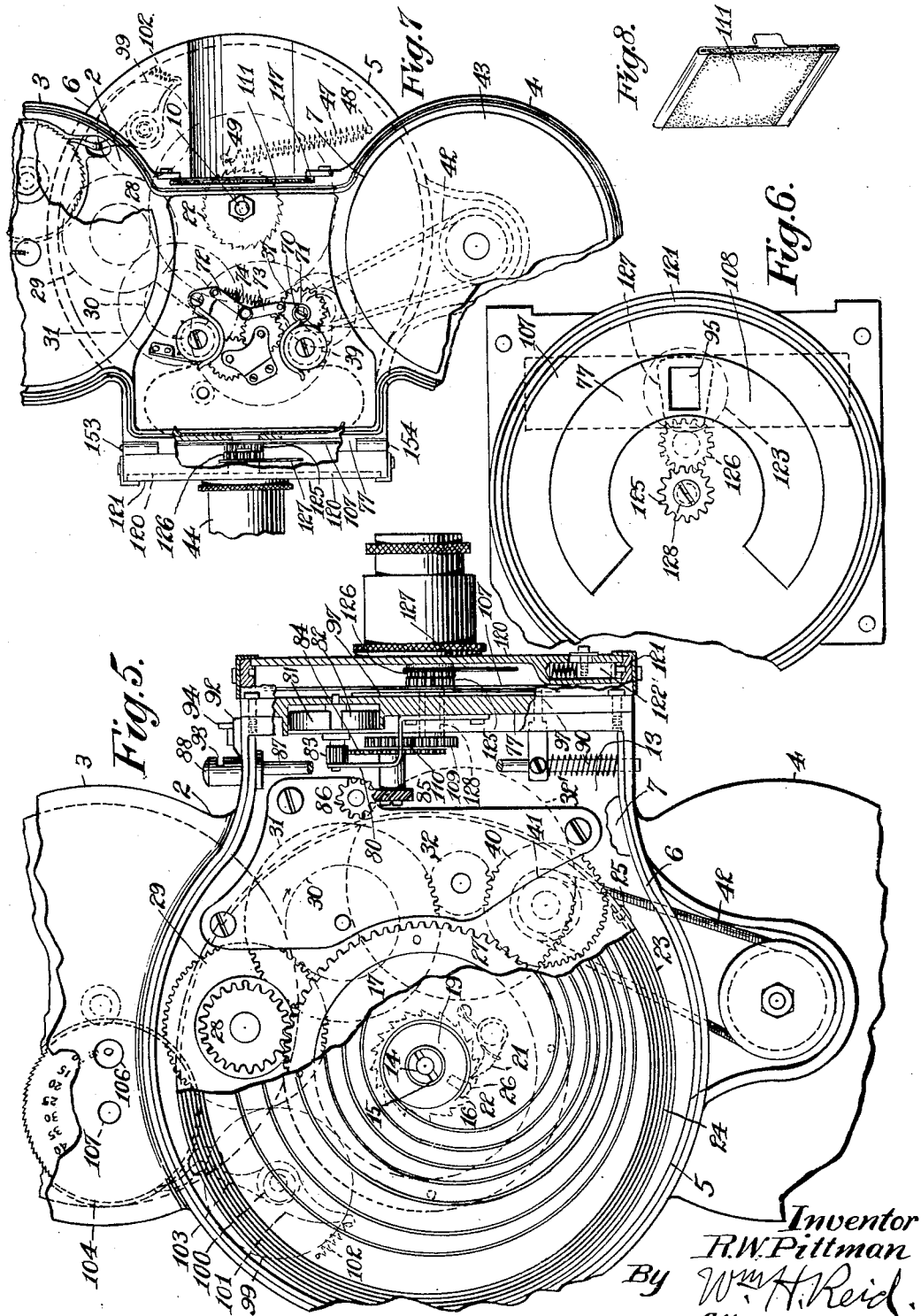

Patented May 31, 1932

1,860,949

UNITED STATES PATENT OFFICE

REINHART W. PITTMAN, OF NEW YORK, N. Y.

MOTION PICTURE APPARATUS

Application filed February 4, 1928. Serial No. 251,832.

This invention has particular reference to motion picture apparatus, both the camera that makes the photograph on the film, and the similar device that causes projection of the film.

One of the objects of this invention is to provide a device that can be used for both of these purposes, without material change or alteration except the provision of a lighting structure.

A further object of the invention is to provide a device of this character that will have convenience of production and assemblage of the several parts with accessibility of the operating parts, at the same time a rigid construction is provided that will not easily become disarranged.

Another object of the invention is to provide an improved lens mounting, for readily changing both the lens and the shutters, when it is desired to use the device for one or the other of said purposes.

Another object is to provide means for changing the apparatus from one use to another and automatically changing the shutters for the different purposes.

In the accompanying drawings showing embodiments of my invention:

Fig. 1 is a side elevation with the lamp member attached.

Fig. 2 is a front elevation without the lamp member.

Fig. 3 shows the lens and shutter mounting.

Fig. 4 shows another form of shutter control.

Fig. 5 is a side view with parts broken away.

Fig. 6 is a detail view showing the shutter.

Fig. 7 is a side view with the front cover door removed.

Fig. 8 shows the closing plate for the lamp mounting.

The present apparatus is designed to be used both as a motion picture camera, and as a projector to project the motion picture scene. It will be understood that the axis of the lens 44, of any desired arrangement, is not obstructed, and by merely removing the closure plate 111 at an opening 112 of the frame, a suitable lamp housing 113 can be applied. This housing carries a suitable electric lamp, with a lens tube 115 having a plate 116 adapted to slide in slots 117 in which the closure plate 111 is fitted when the machine is used as a camera.

The lenses used for projection are usually different from those used to photograph the scene on the film. I provide a carrier plate 120, see Figs. 2 and 3, that has its rim arranged to turn in a rabbeted ring frame 121, see Fig. 5, at the front. A spring bolt 122 on this plate will engage suitable notches in rim 121 to lock the plate in two positions. In one of these positions the lens 123 is located in the axis of the camera, while swinging this carrier a half turn will bring another lens 44 into the same axis. One of these lenses is for camera work, and the other for projection. The shutter disk 107 Fig. 7 as stated makes an exposure for about three-fourths of a rotation but for projection work this tends to produce the flicker and should be reduced. In Figs. 7 and 3 I show an additional shutter that registers with the projection lens 123. A gear 125 is carried by the shutter 107, that engages the gear 126 rotatably mounted on the lens plate 120, and this gear is connected with the shutter 127, whereby the shutter 127 makes a rotation for each rotation of the shutter 107. This shutter 127 swings past the lens 123 for the projection. It will be understood that swinging the carrier 120 to bring either lens to the axis, will cause the gear 126 to remain in engagement with gear 125 and the main shutter. But when this lens 123 is moved out of the axis and the other lens 44 is put in the axis, this shutter 127 will not cross the axis and does not interfere with the normal action of the shutter 107. But when in the active position this shutter 127 will cut off the projection for a short interval when the middle portion of the main shutter slot exposes the lens, and this will reduce the exposure or cause two exposures during the rest period of the film which has been found in practice to produce better results with the projections.

In Fig. 4 another arrangement of double shutters is set forth, in which the shutter disk 107 is omitted. A plate 130 is provided similar to the plate 120 having the two lenses 131 and 132 for exposures and projections that are brought to the axis on swinging the plate as has been described. The spindle 128 merely carries a gear 133 instead of rotating the shutter. This latter gear is in the center of the carrier 130 and engages a gear 134 pivoted on the plate 130, which also carries a shutter 135 that will swing across the lens 131 similar to the construction shown in Fig. 3. The other lens 132 is controlled by a double shutter 136 and 137 that swings on a pivoted gear 138 that engages the said gear 133. By this means the double shutter and the single shutter are always moving past the respective lenses, so that when either one is brought to the axis its shutter will be brought into operation. This double shutter will serve for the projection for each period of exposure, as accomplished by the double shutter device that has been described.

What I claim is:

1. In a motion picture camera adapted for taking exposures and for projections, the combination with the objective lens arranged in a certain axis, of a pivoted carrier having a projection lens thereon and an exposure lens thereon, the carrier being shiftable to bring each of these lenses to said axis alternately, a shutter rotatably mounted on said carrier arranged to swing past one only of the said lens on the carrier, and means for causing rotation of the shutter when its associated lens is swung into the said axis by the carrier.

2. In a motion picture camera adapted for taking exposures and for projections, the combination with the objective lens arranged in a certain axis, of a pivoted carrier having a projection lens thereon and an exposure lens thereon, the carrier being shiftable to bring these lenses to said axis alternately, a shutter rotatably mounted on said carrier arranged to swing past one only of said lens on the carrier, a gear on said shutter, a gear on the camera with which the shutter gear is in mesh when said lens is brought into said axis, causing rotation of the shutter when its associated lens is swung into the said axis.

3. In a motion picture camera, adapted for taking exposures and for projections, the combination with the objective lens arranged in a certain axis, of a pivoted carrier having a projection lens thereon and an exposure lens thereon, the carrier being shiftable to bring each of these lenses to said axis alternately, a shutter rotatably mounted on said carrier arranged to swing past one only of the said lens on the carrier, a gear on said shutter, a gear on the camera with which the shutter gear is in mesh, and which gears remain in mesh when the carrier is swung between said positions, to rotate the shutter constantly but which does not swing across said axis when its associated lens is swung out of such axis.

4. In a motion picture camera, adapted for taking exposures and for projections, the combination with the objective lens arranged in a certain axis, of a pivoted carrier having a projection lens thereon and an exposure lens thereon, and shiftable to bring these lenses to said axis alternately, a shutter rotatably mounted on said carrier arranged to swing past one of said lenses on the carrier, a second shutter rotatably mounted on said carrier arranged to swing past said other lens on the carrier, and means for causing rotation of both of said shutters in all positions of the carrier.

5. In a motion picture camera, adapted for taking exposures and for projections, the combination with the objective lens arranged in a certain axis, of a pivoted carrier having a projection lens thereon and an exposure lens thereon, and shiftable to bring these lenses to said axis alternately, a shutter rotatably mounted on said carrier arranged to swing past one of said lenses on the carrier, means for causing rotation of the shutter when its associated lens is swung into the said axis, a second shutter rotatably mounted on said carrier arranged to swing past said other lens on the carrier, and means for causing rotation of the latter shutter when its associated lens is swung into the said axis.

Signed at New York city, Jan. 3, 1928.

REINHART W. PITTMAN.